United States Patent
Chang et al.

(10) Patent No.: US 10,904,578 B2
(45) Date of Patent: *Jan. 26, 2021

(54) VIDEO PROCESSING APPARATUS AND VIDEO PROCESSING CIRCUITS THEREOF

(71) Applicant: Novatek Microelectronics Corp., Hsinchu (TW)

(72) Inventors: Yu-Wei Chang, Hsinchu (TW); Po-Chin Hu, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,266

(22) Filed: Dec. 24, 2019

(65) Prior Publication Data
US 2020/0137423 A1    Apr. 30, 2020

Related U.S. Application Data

(63) Continuation of application No. 16/136,246, filed on Sep. 19, 2018, now Pat. No. 10,547,874, which is a continuation of application No. 14/583,066, filed on Dec. 24, 2014, now Pat. No. 10,110,928.

(60) Provisional application No. 61/971,533, filed on Mar. 28, 2014.

(30) Foreign Application Priority Data

Oct. 29, 2014  (TW) .............................. 103137411 A

(51) Int. Cl.
 *H04N 19/85*   (2014.01)
 *H04N 19/88*   (2014.01)
 *H04N 19/423*  (2014.01)

(52) U.S. Cl.
 CPC .......... *H04N 19/85* (2014.11); *H04N 19/423* (2014.11); *H04N 19/88* (2014.11)

(58) Field of Classification Search
 None
 See application file for complete search history.

(56) References Cited

U.S. PATENT DOCUMENTS

| | | | | |
|---|---|---|---|---|
| 5,684,960 A   * | 11/1997 | Geyer ................... | H04L 12/433 |
| | | | | 370/232 |
| 7,015,918 B2 * | 3/2006  | Linzer .................. | H04N 19/186 |
| | | | | 345/537 |
| 9,077,625 B2 * | 7/2015  | Yoshida .............. | H04L 43/0817 |
| 2003/0198292 A1* | 10/2003 | Gold .................... | H04N 11/042 |
| | | | | 375/240.01 |
| 2005/0002460 A1* | 1/2005  | Ramakrishnan ..... | H04N 19/423 |
| | | | | 375/240.25 |

(Continued)

*Primary Examiner* — Mohammad J Rahman
(74) *Attorney, Agent, or Firm* — JCIPRNET

(57) ABSTRACT

A video processing apparatus and a video processing circuit of the video processing apparatus are provided. The video processing circuit includes a video processor, a first memory controller, a second memory controller and a distributor. The video processor includes at least one sub-processing-tasks processor which is configured to execute one or more sub-processing tasks respectively. The first memory controller controls a first memory. The second memory controller controls a second memory. The distributor stores the data outputted by the video processor to the first memory and the second memory through the first memory controller and the second memory controller respectively.

6 Claims, 3 Drawing Sheets

(56) References Cited

U.S. PATENT DOCUMENTS

| | | | |
|---|---|---|---|
| 2005/0195975 A1* | 9/2005 | Kawakita | H04L 9/0825 380/30 |
| 2005/0200630 A1* | 9/2005 | Evans | H04N 19/423 345/589 |
| 2006/0182181 A1* | 8/2006 | Lee | H04N 19/16 375/240.24 |
| 2008/0079743 A1* | 4/2008 | Watanabe | H04N 19/436 345/537 |
| 2009/0046207 A1* | 2/2009 | Salvucci | H04N 19/186 348/663 |
| 2009/0092376 A1* | 4/2009 | Kinoshita | H04N 5/783 386/356 |
| 2011/0064137 A1* | 3/2011 | Han | H04N 19/194 375/240.14 |
| 2013/0159604 A1* | 6/2013 | Yeh | G06F 12/0246 711/103 |
| 2013/0236163 A1* | 9/2013 | Hellman | H04N 19/433 386/326 |
| 2014/0334688 A1* | 11/2014 | Saito | H04N 19/433 382/107 |
| 2014/0369562 A1* | 12/2014 | Saito | G06T 7/20 382/103 |
| 2015/0058531 A1* | 2/2015 | Yeh | G06F 12/0246 711/103 |
| 2019/0259259 A1* | 8/2019 | Mullins | G08B 13/19652 |

* cited by examiner

VIDEO PROCESSING APPARATUS AND VIDEO PROCESSING CIRCUITS THEREOF

CROSS-REFERENCE TO RELATED APPLICATION

This application is a continuation application claiming the benefit of U.S. application Ser. No. 16/136,246, filed on Sep. 19, 2018, now allowed, which claims the priority benefits of U.S. Pat. No. 10,110,928, filed on Dec. 24, 2014. The prior U.S. Pat. No. 10,110,928 claims priority benefits of U.S. provisional application Ser. No. 61/971,533, filed on Mar. 28, 2014 and Taiwan application serial no. 103137411, filed on Oct. 29, 2014. The entirety of each of the above-mentioned patent applications is hereby incorporated by reference herein and made a part of this specification.

BACKGROUND

Technical Field

The invention relates to a video processing apparatus, and particularly relates to a video processing apparatus capable of effectively distribute a plurality of memory bandwidths and a video processing circuit thereof.

Related Art

Along with quick development of technology, since a current video processing system is required to process and decode high-definition video data, for example, a transmission bandwidth of 5 Gbytes/s is required to decode a video stream with high-definition image quality (for example, HD, UHD, 4K2K, etc.), the video processing system having a video decoder (or an encoder, a decoder) and/or a video processor generally requires a higher memory bandwidth to load the high-definition video data.

Generally, when the video processor writes a reconstructed video frame into a memory, and reads other video frames from the memory to conduct some modifications (for example, edge enhancement, noise reduction, image scaling, etc.), a problem of memory bandwidth congestion is probably encountered due to frequent accessing of the same memory, which may influence a performance of the video decoder.

SUMMARY

The invention is directed to a video processing apparatus and a video processing circuit thereof, and based on a plurality of memories in the video processing circuit and allocation of bandwidths required for operations, a problem of memory bandwidth congestion is effectively resolved.

An embodiment of the invention provides a video processing circuit including a video processor, a first memory controller, a second memory controller and a distributor. The video processor includes at least one sub-processing-tasks processor configured to execute one or more sub-processing tasks respectively. The first memory controller controls a first memory. The second memory controller controls a second memory. The distributor is coupled to the video processor, the first memory controller and the second memory controller, and stores data outputted by the video processor to the first memory and the second memory through the first memory controller and the second memory controller respectively.

An embodiment of the invention provides a video processing apparatus including a first memory, a second memory and a video processing circuit. The video processing circuit is coupled to the first memory and the second memory. The video processing circuit includes a video processor, a first memory controller, a second memory controller and a distributor. The video processor includes at least one sub-processing-tasks processor configured to execute one or more sub-processing tasks respectively. The first memory controller controls the first memory. The second memory controller controls the second memory. The distributor is coupled to the video processor, the first memory controller and the second memory controller, and stores data outputted by the video processor to the first memory and the second memory through the first memory controller and the second memory controller respectively.

According to the above descriptions, the invention provides a video processing circuit and a video processing apparatus using the same, and based on a plurality of memory controllers configured in the video processing circuit and based on allocation of the memory bandwidth required for video data operation, the problem of memory bandwidth congestion is effectively resolved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
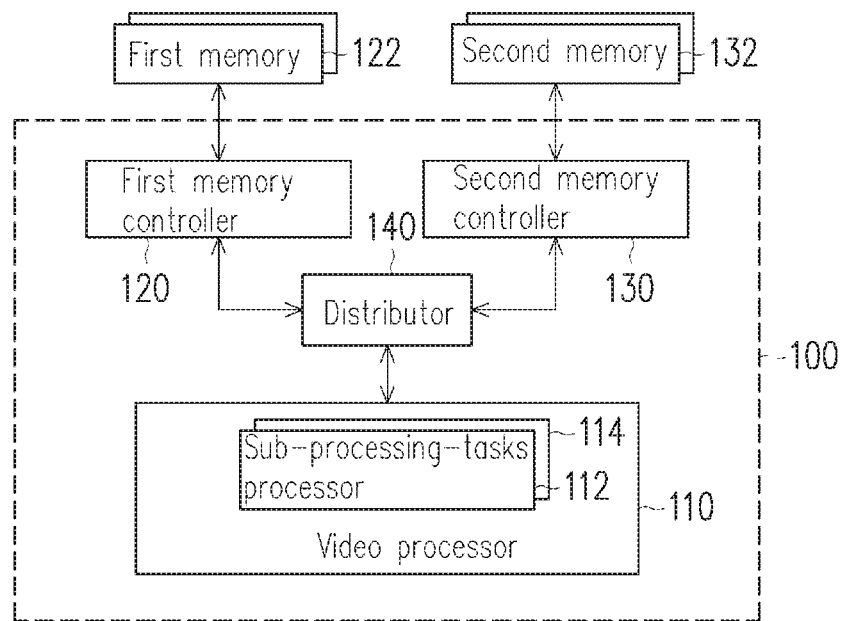
FIG. 1 is a circuit block schematic diagram of a video processing apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a circuit block schematic diagram of a video processing apparatus 10 according to an embodiment of the invention. Referring to FIG. 1, the video processing apparatus 10 includes a video processing circuit 100, at least one first memory 122 and at least one second memory 132. The video processing circuit 100 includes a video processor 110, a first memory controller 120, a second memory controller 130 and a distributor 140, where the distributor 140 is coupled between the first memory controller 120, the second memory controller 130 and the video processor 110. In the present embodiment, the video processor 110 includes at least one sub-processing-tasks processor (for example, the sub-processing-tasks processors 112 and 114 shown in FIG. 1). The at least one sub-processing-tasks processor are configured to execute one or more sub-processing tasks (for example, a decoding task, a post processing task or other video processing tasks) respectively. Based on principles of simplicity and clarity, in the video processor 110 of FIG. 1, only two sub-processing-tasks processors 112 and 114 are illustrated, though the number of the sub-processing-tasks processors in the video processor 110 is not limited thereto.

In FIG. 1, The first memory controller 120 and the second memory controller 130 respectively control the corresponding first memory 122 and the second memory 132. The distributor 140 stores data outputted by the video processor 110 to the first memory 122 and the second memory 132 through the first memory controller 120 and the second memory controller 130. Each of the at least one sub-processing-tasks processor in the video processor 110 can access at least one of the first memory 122 and the second memory 132 through the distributor and at least one of the first memory controller 120 and the second memory controller 130. For example, the sub-processing-tasks processor 112 in the video processor 110 can access data of the first memory 122 through the distributor 140 and the first memory controller 120, and/or access data of the second memory 132 through the distributor 140 and the second memory controller 130. Deduced by analogy, the sub-processing-tasks processor 114 in the video processor 110 can also access data of at least one of the first memory 122 and the second memory 132 through the distributor 140.

It should be noticed that the distributor 140 can store video data to the corresponding memory according to different distribution rules. For example, in some embodiments, the distributor 140 can store at least a part of the video data outputted by the video processor 110 to the first memory 122 through the first memory controller 120, and copy the same data to the second memory 132 through the second memory controller 130. Therefore, since the first memory 122 an the second memory 132 stores the same video data, when the video processor 110 is about to read (retrieve) the video data, the distributor 140 can dynamically adjust a transmission bandwidth of the first memory 122 and a transmission bandwidth of the second memory 132 according to a bandwidth usage state of the memories. For example, the bandwidth of the first memory 122 is 70%, the bandwidth of the second memory 132 is 30%, such that the distributor 140 obtains 70% of the video data from the first memory 122 and obtains the remained 30% of the video data from the second memory 132, and transmits the video data to the video processor 110. However, the bandwidth distribution method is not limited thereto.

In another embodiment, the distributor 140 can divide the video dada (for example, a video frame) outputted by the video processor 110 into two parts, where the first part of the video data outputted by the video processor 110 is stored to the first memory 122, and the second part of the video data outputted by the video processor 110 is stored to the second memory 132, so as to mitigate memory bandwidth congestion. In detail, the distribution method of the video data outputted by the video processor 110 can be determined according to the type of the video data.

For example, it is assumed that when the sub-processing task processed by the video processor 110 is a video decoding task, the sub-processing-tasks processor 112 in the video processor 110 can be a video decoding processor, which is used for executing a decoding task to reconstruct at least one video frame (video data) from encoded video data. The first part of the video data may include brightness data (Y) of the video frame, and the second part of the video data may include chrominance data (C) of the video frame. Taking a color format YUV of 4:2:0 as an example, the first memory 122 may have ⅔ of the total bandwidth, and the second memory 132 may have ⅓ of the total bandwidth. Through the distributor 140, the first memory controller 120 and the second memory controller 130, the video decoding processor (i.e. the sub-processing-tasks processor 112) can store the brightness data (Y) of the video data into the first memory 122, and store the chrominance data (C) into the second memory 132. Through the distributor 140, the first memory controller 120 and the second memory controller 130, the video decoding processor (i.e. the sub-processing-tasks processor 112) can retrieve the brightness data (Y) from the first memory 122, and retrieve the chrominance data (C) from the second memory 132.

For another example, the first part of the video data outputted by the video processor 110 may include a part of line data (for example, odd lines) of the video frame, and the second part of the video data includes another part of the line data (for example, even lines), though the invention is not limited thereto. Through the distributor 140, the first memory controller 120 and the second memory controller 130, the video decoding processor (i.e. the sub-processing-tasks processor 112) can store the even line data of the video data (for example, the video frame) into the first memory 122, and stores the odd line data into the second memory 132. Through the distributor 140, the first memory controller 120 and the second memory controller 130, the video decoding processor (i.e. the sub-processing-tasks processor 112) can retrieve the even line data from the first memory 122, and retrieve the odd line data from the second memory 132.

In some other embodiments, when the sub-processing task processed by the video processor 110 is a decoding task, the sub-processing-tasks processor 112 in the video processor 110 can be a video decoding processor, which is used for executing a decoding task to reconstruct at least one video frame from encoded video data. In other embodiments, the sub-processing-tasks processor 112 in the video processor 110 can be a video encoder or a video codec. When the sub-processing task processed by the video processor 110 is a post processing task, the sub-processing-tasks processor 114 in the video processor 110 can be a post processing processor, which is used for executing a post processing task to the video frame reconstructed by the video decoding processor.

Figure 2:
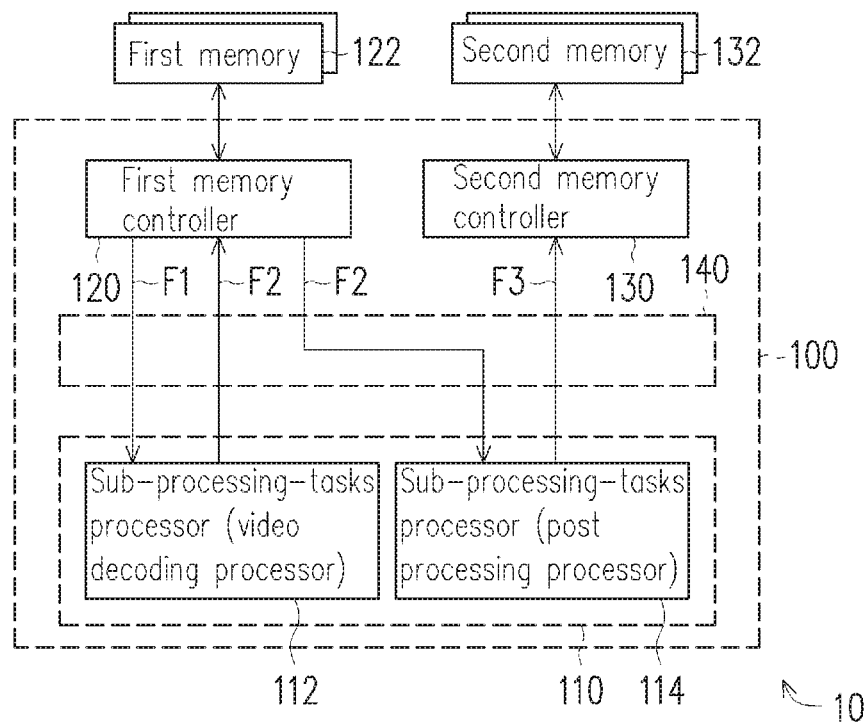
FIG. 2 is a schematic diagram of data flows of the video processing apparatus and a video processing circuit of FIG. 1 according to an embodiment of the invention.

For example, FIG. 2 is a schematic diagram of data flows of the video processing apparatus 10 and the video processing circuit 100 of FIG. 1 according to an embodiment of the invention. The distributor 140 can read a reference frame F1 from the first memory 122 (through the first memory controller 120), and provides the reference frame F1 to the sub-processing-tasks processor 112 (for example, the video decoding processor). The sub-processing-tasks processor 112 (for example, the video decoding processor) can execute the decoding task according to the reference frame F1 to obtain a reconstruction frame F2. The distributor 140 can store the reconstruction frame F2 (the video data) outputted by the sub-processing-tasks processor 112 (for example, the video decoding processor) to the first memory 122 (through the first memory controller 120). The sub-processing-tasks processor 114 (for example, the post processing processor) can retrieve the reconstruction frame F2 (the video data) from the first memory 122 through the distributor 140 and the first memory controller 120. The sub-processing-tasks processor 114 can perform some modifications (for example, edge enhancement, temporal noise reduction, picture scaling, etc.) to the reconstruction frame F2. The distributor 140 can store a modification result (a video frame F3) outputted by the sub-processing-tasks processor 114 into the second memory 132 (through the second memory controller 130).

In very few applications, the operation of retrieving the reconstruction frame F2 (the video data) from the first memory 122 by the sub-processing-tasks processor 114 may increase a bandwidth loading of the first memory 122, or may even cause a bandwidth congestion. The bandwidth congestion probably influences a performance of the sub-processing-tasks processor 112 (for example, the video decoding processor).

Figure 3:
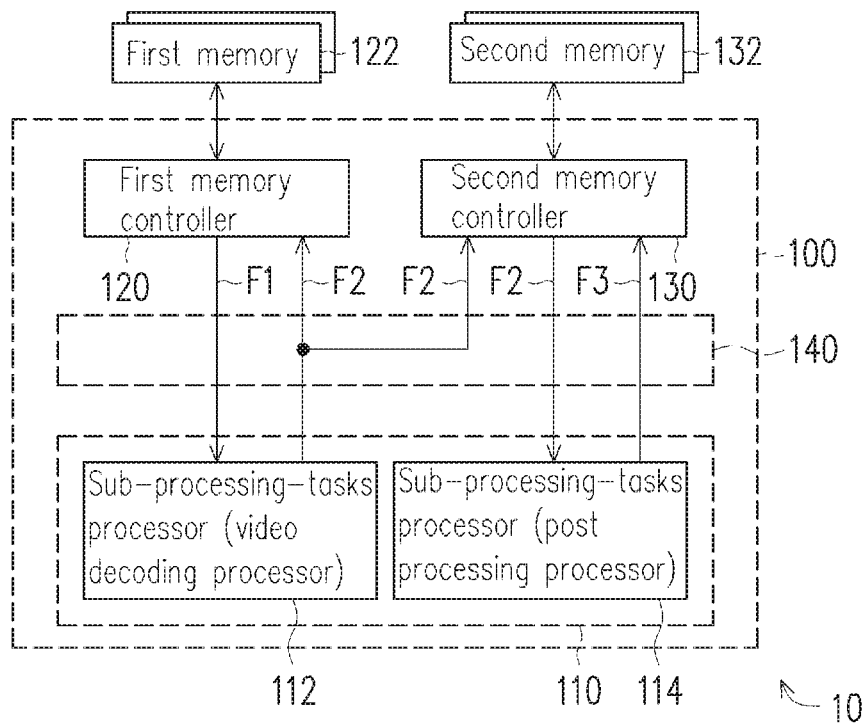
FIG. 3 is a schematic diagram of data flows of the video processing apparatus and the video processing circuit of FIG. 1 according to another embodiment of the invention.

FIG. 3 is a schematic diagram of data flows of the video processing apparatus 10 and the video processing circuit 100 of FIG. 1 according to another embodiment of the invention. The embodiment of FIG. 3 can be deduced according to the description of FIG. 2. In the embodiment of FIG. 3, in order to reduce the bandwidth loading of the first memory 122, except that the distributor 140 can store the reconstruction frame F2 (the video frame) generated by the sub-processing-tasks processor 112 (for example, the video decoding processor) into the first memory 122 through the first memory controller 120, the distributor 140 can also copy the same reconstruction frame F2 (the video frame) to the second memory 132 through the second memory controller 130. The sub-processing-tasks processor 112 can access the video frame (for example, to retrieve the reconstruction frame F2) in the first memory 122 through the distributor 140 and the first memory controller 120. The sub-processing-tasks processor 114 can access the video frame in the second memory 132 through the distributor 140 and the second memory controller 130. Since the first memory 122 and the second memory 132 store the same reconstruction frame F2, when the sub-processing-tasks processor 114 (for example, the post processing processor) is about to read the reconstruction frame F2, the distributor 140 can retrieve the reconstruction frame F2 from the second memory 132 for the sub-processing-tasks processor 114 through the second memory controller 130 without retrieving the reconstruction frame F2 from the first memory 122. Therefore, compared to the embodiment of FIG. 2, the embodiment of FIG. 3 can reduce the bandwidth loading of the first memory 122, and the performance of the sub-processing-tasks processor 112 (for example, the video decoding process) is improved.

In other embodiments, the distributor 140 can store the first part of the video frame outputted by the video decoding processor (the sub-processing-tasks processor 112) into the first memory 122, and store the second part of the video frame outputted by the video decoding processor (the sub-processing-tasks processor 112) into the second memory 132. The first part includes brightness data of the video frame, and the second part includes chrominance data of the video frame. Alternatively, the first part includes a part of the line data (for example, the even line data) of the video frame, and the second part includes the other part of the line data (for example, the odd line data) of the video frame.

Figure 4:
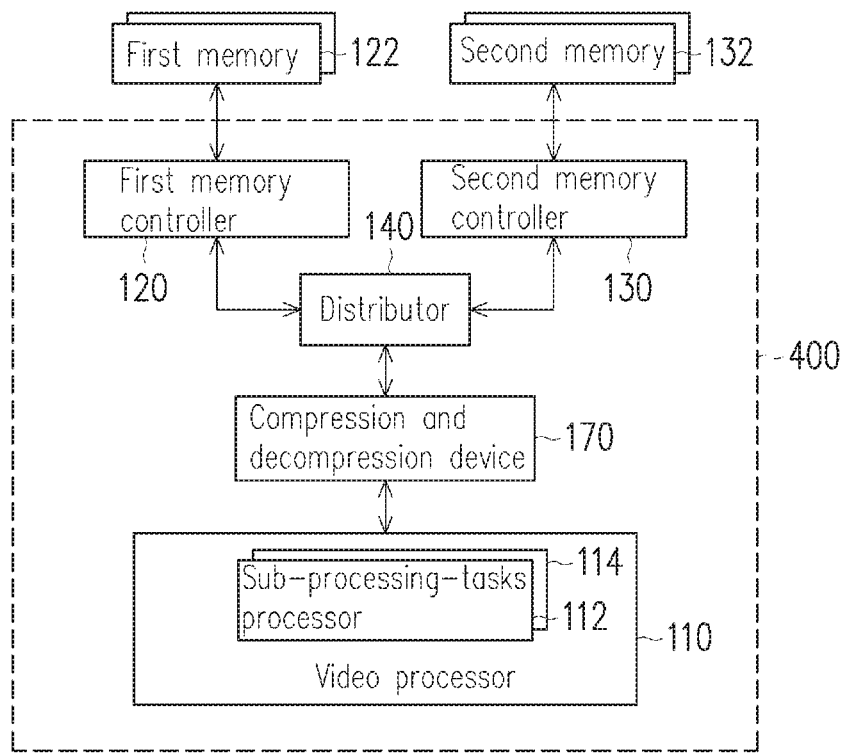
FIG. 4 is a circuit block schematic diagram of a video processing apparatus according to another embodiment of the invention.

FIG. 4 is a circuit block schematic diagram of a video processing apparatus 40 according to another embodiment of the invention. The video processing apparatus 40 of FIG. 4 includes a video processing circuit 400, the first memory 122 and the second memory 132. The video processing apparatus 40, the video processing circuit 400, the first memory 122 and the second memory 132 shown in FIG. 4 can be deduced by referring to related descriptions of the video processing apparatus 10, the video processing circuit 100, the first memory 122 and the second memory 132 shown in FIG. 1 to FIG. 3. Referring to FIG. 4, the video processing circuit 400 of FIG. 4 includes the video processor 110, the first memory controller 120, the second memory controller 130, the distributor 140 and a compression and decompression device 170. The video processor 110, the first memory controller 120, the second memory controller 130 and the distributor of FIG. 4 can be deduced according to related descriptions of FIG. 1 to FIG. 3.

The compression and decompression device 170 is coupled between one of the sub-processing-tasks processors (for example, 112 or 114) and the distributor 140. The compression and decompression device 170 can compress a video frame outputted by the sub-processing-tasks processor (for example, 112 or 114) to obtain at least one compressed frame. The distributor 140 can store the compressed frame outputted by the compression and decompression device 170 to the first memory 122 through the first memory controller 120. Moreover, the compression and decompression device 170 can retrieve the compressed frame from the first memory 122 through the distributor 140 and the first memory controller 120, and decompress the same to obtain a corresponding decompressed frame to the sub-processing-tasks processor (for example, 112 or 114) of the video processor 110.

For example, if the sub-processing-tasks processor 112 is the video decoding processor, the compression and decompression device 170 compresses the video frame outputted by the video decoding processor (i.e. the sub-processing-tasks processor 112) to obtain at least one compressed frame, and the distributor 140 stores the compressed frame outputted by the compression and decompression device 170 to the first memory 122 through the first memory controller 120. Moreover, the compression and decompression device 170 retrieves the compressed frame from the first memory 122 through the distributor 140 and the first memory controller 120, and decompress the same to obtain a corresponding decompressed frame to the video decoding processor (i.e. the sub-processing-tasks processor 112).

In another embodiment, the distributor 140 can store the compressed frame outputted by the compression and decompression device 170 to the second memory 132 through the second memory controller 130. Moreover, the compression and decompression device 170 can retrieve the compressed frame from the second memory 132 through the distributor 140 and the second memory controller 130, and decompress the same to obtain a corresponding decompressed frame to the sub-processing-tasks processor (for example, 112 or 114) of the video processor 110.

Figure 5:
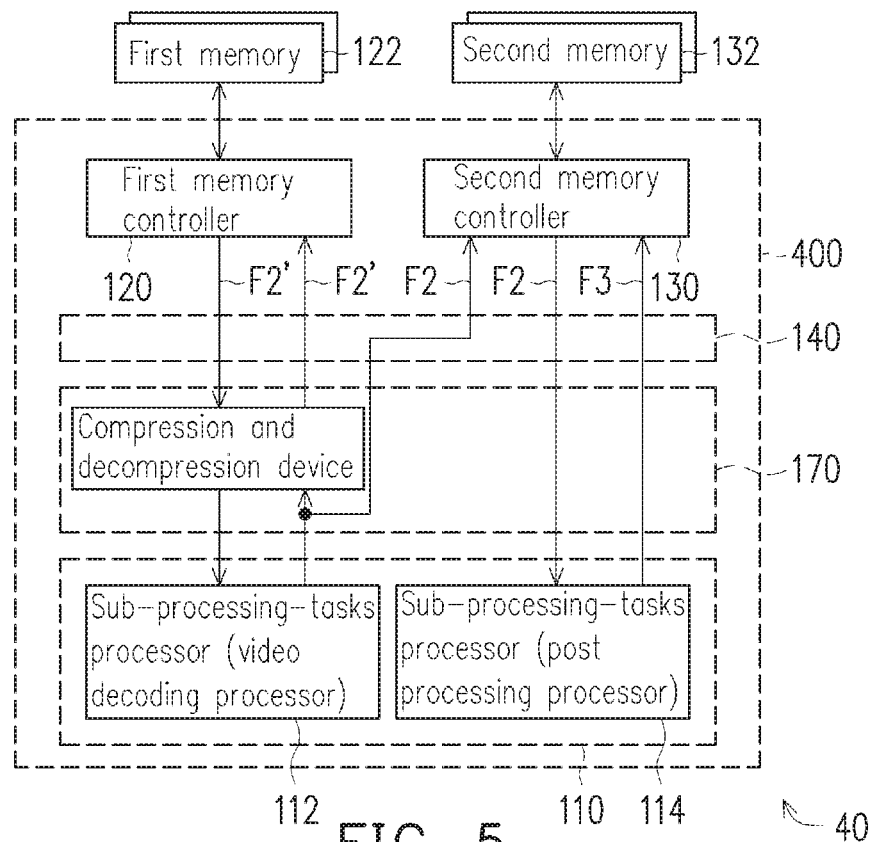
FIG. 5 is a schematic diagram of data flows of the video processing apparatus and a video processing circuit of FIG. 4 according to an embodiment of the invention.

FIG. 5 is a schematic diagram of data flows of the video processing apparatus 40 and the video processing circuit 400 of FIG. 4 according to an embodiment of the invention. The embodiment of FIG. 5 can be deduced according to related descriptions of the sub-processing-tasks processor 112, the sub-processing-tasks processor 114, the first memory controller 120, the second memory controller 130 and the distributor 140 shown in FIG. 3, and details thereof are not repeated. In the embodiment of FIG. 5, in order to save a storage space of the first memory 122, the compression and decompression device 170 compresses the video frame (the reconstruction frame F2) outputted by the sub-processing-tasks processor 112 (for example, the video decoding processor) to obtain a compressed frame F2'. The distributor 140 stores the compressed frame F2' outputted by the compression and decompression device 170 to the first memory 122 through the first memory controller 120. The compression and decompression device 170 can retrieve the compressed frame F2' from the first memory 122 through the distributor 140 and the first memory controller 120, and decompress the same to obtain a corresponding decompressed frame to the sub-processing-tasks processor 112 (for example, the video decoding processor).

Figure 6:
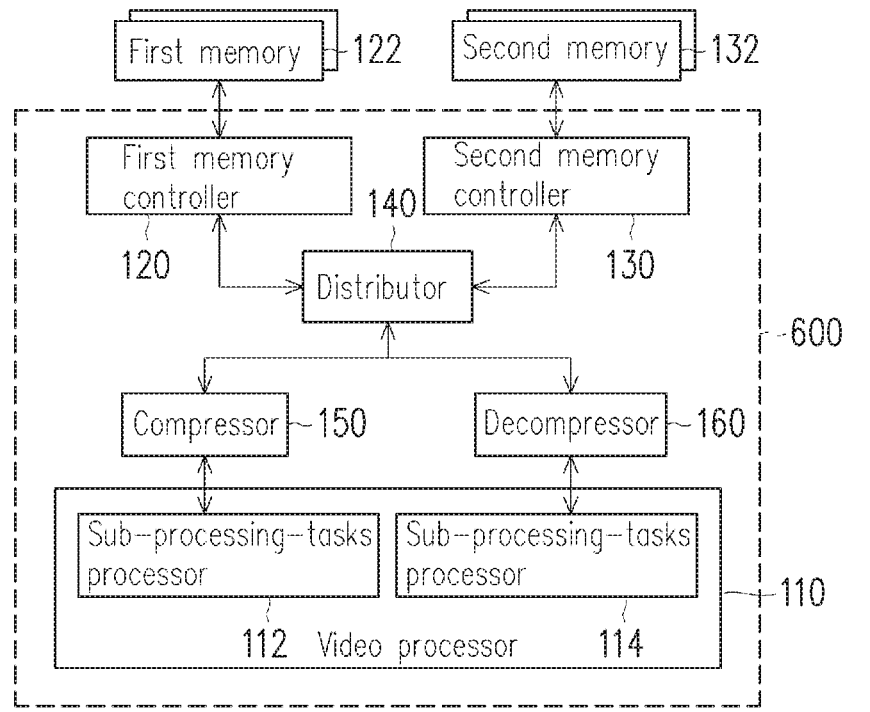
FIG. 6 is a circuit block schematic diagram of a video processing apparatus according to still another embodiment of the invention.

FIG. 6 is a circuit block schematic diagram of a video processing apparatus 60 according to still another embodiment of the invention. The video processing apparatus 60 of FIG. 6 includes a video processing circuit 600, the first memory 122 and the second memory 132. The video processing apparatus 60, the video processing circuit 600, the first memory 122 and the second memory 132 shown in FIG. 6 can be deduced by referring to related descriptions of the video processing apparatus 10, the video processing circuit 100, the first memory 122 and the second memory 132 shown in FIG. 1 to FIG. 3. The video processing circuit 600 of FIG. 6 includes the video processor 110, the first memory controller 120, the second memory controller 130, the distributor 140, a compressor 150 and a decompressor 160. The video processor 110, the first memory controller 120, the second memory controller 130 and the distributor of FIG. 6 can be deduced according to related descriptions of FIG. 4.

The compressor 150 is coupled between one of the at least one sub-processing-tasks processor and the distributor 140. The decompressor 160 is coupled between another one of the at least one sub-processing-tasks processor and the distributor 140. For example, the compressor 150 is coupled between the sub-processing-tasks processor 112 (for example, the video decoding processor) and the distributor 140, and the decompressor 160 is coupled between the sub-processing-tasks processor 114 (for example, the post processing processor) and the distributor 140. The compressor 150 compresses a video frame outputted by the sub-processing-tasks processor 112 to obtain at least one compressed frame, and the distributor 140 stores the compressed frame outputted by the compressor 150 to the second memory 132 through the second memory controller 130. Moreover, the decompressor 160 retrieves the compressed frame from the second memory 132 through the distributor 140 and the second memory controller 130, and decompress the same to obtain a corresponding decompressed frame to the sub-processing-tasks processor 114.

For example, if the sub-processing-tasks processor 112 is the video decoding processor, the compressor 150 compresses the video frame outputted by the video decoding processor (i.e. the sub-processing-tasks processor 112) to obtain at least one compressed frame. The distributor 140 stores the compressed frame outputted by the compressor 150 to the second memory 122. The decompressor 160 retrieves the compressed frame from the second memory 132 through the distributor 140 and the second memory controller 130, and decompress the same to obtain a corresponding decompressed frame to the post processing processor (i.e. the sub-processing-tasks processor 114).

In summary, the invention provides a video processing circuit and a video processing apparatus using the same. The video processing circuit in the video processing apparatus can store the video data generated by the video processor into a plurality of memories. The distributor is used to allocate a memory bandwidth, such that the bandwidth of each memory is adequate to deal with video streams with high resolution, so as to effectively resolve the problem of memory bandwidth congestion.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A video processing circuit, comprising:
a video processor, comprising at least one sub-processing-tasks processor configured to execute one or more sub-processing tasks respectively;
a first memory controller, controlling a first memory;
a second memory controller, controlling a second memory; and
a distributor, coupled to the video processor, the first memory controller and the second memory controller, storing data outputted by the video processor to the first memory and the second memory through the first memory controller and the second memory controller respectively, and providing at least one of data stored in the first memory and data stored in the second memory to the video processor,
wherein the distributor stores a first part of a video frame outputted by the video processor to the first memory and stores a second part of the same video frame outputted by the video processor to the second memory, wherein the first and second part of the video frame are color data of the video frame.

2. The video processing circuit as claimed in claim 1, wherein one of the one or more sub-processing tasks is a decoding task, and one of the at least one sub-processing-tasks processor is a video decoding processor configured to execute the decoding task to reconstruct at least one video frame from an encoded video data, and another one of the one or more sub-processing tasks is a post processing task, and another one of the at least one sub-processing-tasks processor is a post processing processor configured to execute the post processing task to the video frame reconstructed by the video decoding processor.

3. The video processing circuit as claimed in claim 1, wherein the first part comprises brightness data of the video frame, and the second part comprises chrominance data of the video frame.

4. The video processing circuit as claimed in claim 1, wherein the first part comprises a part of line data of the video frame, and the second part comprises another part of line data of the video frame.

5. A video processing apparatus, comprising:
a first memory;
a second memory; and
a video processing circuit, coupled to the first memory and the second memory, and comprising:
a video processor, comprising at least one sub-processing-tasks processor configured to execute one or more sub-processing tasks respectively;
a first memory controller, controlling the first memory;
a second memory controller, controlling the second memory; and a distributor, coupled to the video processor, the first memory controller and the second memory controller, storing data outputted by the video processor to the first memory and the second memory through the first memory controller and the second memory controller respectively, and providing at least one of data stored in the first memory and data stored in the second memory to the video processor, wherein the distributor stores a first part of a video frame outputted by the video processor to the first memory, and stores a second part of the same video frame the data outputted by the video processor to the second memory, wherein the first and second parts of the video frame includes color data of the video frame.

6. The video processing apparatus as claimed in claim 5, wherein one of the one or more sub-processing tasks is a decoding task, and one of the at least one sub-processing-tasks processor is a video decoding processor configured to execute the decoding task to reconstruct at least one video frame from an encoded video data, and another one of the one or more sub-processing tasks is a post processing task, and another one of the at least one sub-processing-tasks processor is a post processing processor configured to execute the post processing task to the video frame reconstructed by the video decoding processor.

\* \* \* \* \*